US009535779B1

(12) United States Patent
Ma et al.

(10) Patent No.: US 9,535,779 B1
(45) Date of Patent: Jan. 3, 2017

(54) METHOD AND SYSTEM FOR PREDICTING REDUNDANT ARRAY OF INDEPENDENT DISKS (RAID) VULNERABILITY

(71) Applicant: EMC Corporation, Hopkinton, MA (US)

(72) Inventors: Ao Ma, Palo Alto, CA (US); Surendar Chandra, Sunnyvale, CA (US); Frederick Douglis, Basking Ridge, NJ (US); Guanlin Lu, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 195 days.

(21) Appl. No.: 14/341,669

(22) Filed: Jul. 25, 2014

(51) Int. Cl.
*G06F 11/00* (2006.01)
*G06F 11/07* (2006.01)
*G06F 11/30* (2006.01)

(52) U.S. Cl.
CPC ......... *G06F 11/076* (2013.01); *G06F 11/0727* (2013.01); *G06F 11/3034* (2013.01)

(58) Field of Classification Search
CPC .. G06F 11/076; G06F 11/0727; G06F 11/3034
See application file for complete search history.

(56) References Cited

U.S. PATENT DOCUMENTS

| | | | | |
|---|---|---|---|---|
| 5,727,144 A | * | 3/1998 | Brady | G06F 11/004 714/57 |
| 7,373,559 B2 | * | 5/2008 | Guha | G06F 11/008 714/54 |
| 7,653,847 B1 | | 1/2010 | Liikanen et al. | |
| 7,685,360 B1 | | 3/2010 | Brunnett et al. | |
| 7,752,491 B1 | | 7/2010 | Liikanen et al. | |
| 7,916,421 B1 | | 3/2011 | Liikanen et al. | |
| 8,953,265 B1 | * | 2/2015 | Ma | G11B 27/36 360/31 |
| 9,141,457 B1 | * | 9/2015 | Ma | G06F 11/008 |
| 2007/0079170 A1 | * | 4/2007 | Zimmer | G06F 11/008 714/6.23 |

(Continued)

OTHER PUBLICATIONS

Anderson, D. , et al., "More than an interface—SCSI vs. ATA", *Proceedings of the 2nd Annual Conference on File and storage Technology (FAST)*, Mar. 2003.

(Continued)

*Primary Examiner* — Philip Guyton
(74) *Attorney, Agent, or Firm* — Blakely, Sokoloff, Taylor & Zafman LLP

(57) ABSTRACT

Techniques for determining vulnerability of disks are described herein. According to one embodiment, for each of a plurality of disks representing a redundant array of independent disks (RAID), a reallocated sector count associated with the disk is obtained, the reallocated sector count representing a number of sectors that have been reallocated due to an error of a storage transaction to the disk. A failure probability of the disk given the obtained reallocated sector count is determined using a predictive model, wherein the predictive model was generated based on history operating data of a set of known disks. Thereafter, a failure probability of at least two of the disks in the RAID is determined based on the failure probability of each of the disks to determine vulnerability of the RAID.

18 Claims, 6 Drawing Sheets

(56) References Cited

U.S. PATENT DOCUMENTS

| | | | | |
|---|---|---|---|---|
| 2008/0115014 | A1* | 5/2008 | Vaidyanathan | G06F 11/008 714/42 |
| 2008/0250265 | A1* | 10/2008 | Chang | G06F 11/008 714/4.12 |
| 2015/0074467 | A1* | 3/2015 | Jacoby | G06F 11/3034 714/47.1 |

OTHER PUBLICATIONS

Bairavasundaram, L. N., et al., "An Analysis of Data Corruption in the Storage Stack", *Proceedings of the 6th USENIX Conference on File and Storage Technologies (FAST '08)*, Feb. 2008.

Bairavasundaram, L. N., et al., "An Analysis of Latent Sector Errors in Disk Drives", *Proceedings of SIGMETRICS'07*, Jun. 2007.

Bodik, P., et al., "Fingerprinting the Datacenter: Automated Classification of Performance Crises", *In Proceedings of EuroSys'10*, 2010.

Corbett, P., et al., "Row-Diagonal Parity for Double Disk Failure Correction", *Proceedings of The Third USENIX Conference on File and Storage Technologies (FAST '04)*, Mar. 2004.

Elerath, J. G., et al., "Disk Drive Reliability Case Study: Dependence Upon Head Fly-Height and Quantity of Heads", *2003 Proceedings Annual Reliability and Maintainability Symposium (RAMS '03)*, Jan. 2003.

Elerath, Jon, "Hard-Disk Drives: The Good, the Bad, and the Ugly", *Communications of the ACM*, 52(6), Jun. 2009.

Elerath, J. G., et al., "Server Class Disk Drives: How Reliable Are They?", *2004 Proceedings Annual Reliability and Maintainability Symposium (RAMS '04)*, Jan. 2004.

Goldszmidt, Moises, "Finding soon-to-fail disks in a haystack", *In Workshop on Hot Topics in Storage and file Systems (HotStorage '12)*, Jun. 2012.

Gray, J., et al., "Empirical Measurements of Disk Failure Rates and Error Rates", *Microsoft Research Technical Report MSR-TR-2005-166*, Dec. 2005.

Hamerly, G., et al., "Bayesian approaches to failure prediction for disk drives", *Proceedings of the Eighteenth International Conference on Machine Learning (ICML '01)*, 2001.

Hughes, G. F., et al., "Improved Disk-Drive Failure Warnings", *IEEE Transactions on Reliability*, 51(3), Sep. 2002.

Kari, Hannu H., "Latent Sector Faults and Reliability of Disk Arrays", *PhD Thesis, Helsinki University of Technology*, Sep. 1997.

Krioukov, A., et al., "Parity Lost and Parity Regained", *In Proceedings of the 6th USENIX Conference on File and Storage Technologies (FAST '08)*, Feb. 2008.

Lancaster, L., et al., "Measuring Real World Data Availability", *In Proceedings of the LISA 2001 15th Systems Administration Conference*, Dec. 2001.

Murray, J. F., et al., "Hard drive failure prediction using non-parametric statistical methods", *Proceedings ICANN/ICONIP 2003*.

Murray, J. F., et al., "Machine Learning Methods for Predicting Failures in Hard Drives: A Multiple-Instance Application", *Journal of Machine Learning Research*, vol. 6, 2005.

Patterson, D., et al., "A Case for Redundant Arrays of Inexpensive Disks (RAID)", *Proceedings of the 1988 ACM SIGMOD International Conference on Management of Data (SIGMOD '88)*, Jun. 1988.

Pinheiro, E., et al., "Failure Trends in a Large Disk Drive Population", *Proceedings of the 5th USENIX Conference on File and Storage Technologies (FAST '07)*, Feb. 2007.

Prabhakaran, V., et al., "IRON File Systems", *In Proceedings of the 20th ACM Symposium on Operating Systems Principles (SOSP '05)*, Oct. 2005.

Schroeder, B., et al., "Disk failures in the real world: What does and MTTF of 1,000,000 hours mean to you?", *In Proceedings of the 5th USENIX Conference on File and Storage Technologies (FAST '07)*, Feb. 2007.

Schroeder, B., et al., "Understanding latent sector errors and how to protect against them", *In Proceedings of the 8th USENIX Conference on File and Storage Technologies (FAST '10)*, Feb. 2010.

Schwarz, T., et al., "Disk Failure Investigations at the Internet Archive", *NASA/IEEE Conference on Mass Storage Systems and Technologies (MSST 2006)*, May 2006.

Schwarz, T. J., et al., "Disk Scrubbing in Large Archival Storage Systems", *Proceedings of the 12th IEEE/ACM International Symposium on Modeling, Analysis, and Simulation of Computer and Telecommunication Systems (MASCOTS 2004)*, Oct. 2004.

Shah, S., et al., "Reliability Analysis of Disk Drive Failure Mechanisms", *2005 Proceedings Annual Reliability and Maintainability Symposium (RAMS '05)*, Jan. 2005.

Talagala, N., et al., "An Analysis of Error Behavior in a Large Storage System", *University of California, Berkeley, Computer Science Division, Report No. UCB/CSD-99/1042*, Feb. 1999.

Wallace, G., et al., "Characteristics of Backup Workloads in Production Systems", *In Proceedings of the 10th USENIX Conference on File and Storage Technologies (FAST '12)*, Feb. 2012.

Notice of Allowance, U.S. Appl. No. 14/340,358, dated Sep. 30, 2014, 11 pages.

* cited by examiner $$P(fail|RS) = \frac{P(RS|fail) \times P(fail)}{P(RS)} \quad \underline{401}$$

$$P(vulnerable\ RAID|RS_1, RS_2, \ldots, RS_N) = P(\geq 2\ disks\ fail|RS_1, RS_2, \ldots, RS_N)$$
$$= 1 - P(0\ disk\ fail|RS_1, RS_2, \ldots, RS_N) - P(1\ disk\ fail|RS_1, RS_2, \ldots, RS_N) \quad \underline{402}$$

$$P(0\ disk\ fail|RS_1, RS_2, \ldots, RS_N) = \prod_{i=1}^{N}(1 - P(i_{th}\ disk\ fail|RS_i)) \quad \underline{403}$$

$$P(1\ disk\ fail|RS_1, RS_2, \ldots, RS_N) = \sum_{j=1}^{N} P(j_{th}\ disk\ fail|RS_j) \prod_{i=1, i\neq j}^{N}(1 - P(i_{th}\ disk\ fail|RS_i)) \quad \underline{404}$$

N is the number of disks in a RAID group
$RS_i$ represents the reallocated sector count of disk i
$P(i_{th}\ disk\ fail|RS_i)$ represents the failure probability of $i_{th}$ disk given RS reallocated sector count

FIG. 4

METHOD AND SYSTEM FOR PREDICTING REDUNDANT ARRAY OF INDEPENDENT DISKS (RAID) VULNERABILITY

FIELD OF THE INVENTION

Embodiments of the present invention relate generally to data storage systems. More particularly, embodiments of the invention relate to determining vulnerability of storage disks.

BACKGROUND

Data storage utilization is continually increasing, causing the proliferation of storage systems in data centers. Hard disk drives are the primary storage media in enterprise environments. Despite the central role hard disks in storing precious data, they are among the most vulnerable hardware components in a computer system. Storage systems have relied on redundancy mechanisms such as RAID to tolerate disk failures. However, RAID's protection is weakened given the fault model presented by modern disk drives. For example, in production systems many disks fail at a similar age; this means RAID systems face a high risk of multiple whole-disk failures. The increasing frequency of sector errors in working disks means RAID systems face a high risk of reconstruction failure. In short, RAID passive protection is not robust enough in the face of these new challenges.

Much of RAID previous work has focused on improving redundancy schemes to tolerate more simultaneous disk failures. However, some data analysis reveal that the likelihood of simultaneous whole-disk failures increases considerably at certain disk ages. Further, the accumulation of sector errors contributes to the whole-disk failure causing the disk reliability to deteriorate continuously. Hence, ensuring data reliability in the worst case requires adding considerable extra redundancy, making a traditional passive approach of RAID protection unattractive from a cost perspective.

BRIEF DESCRIPTION OF THE DRAWINGS

Embodiments of the invention are illustrated by way of example and not limitation in the figures of the accompanying drawings in which like references indicate similar elements.

FIG. 4 is a diagram illustrating certain formulas that can be used with certain embodiments of the invention.

DETAILED DESCRIPTION

Figure 1:
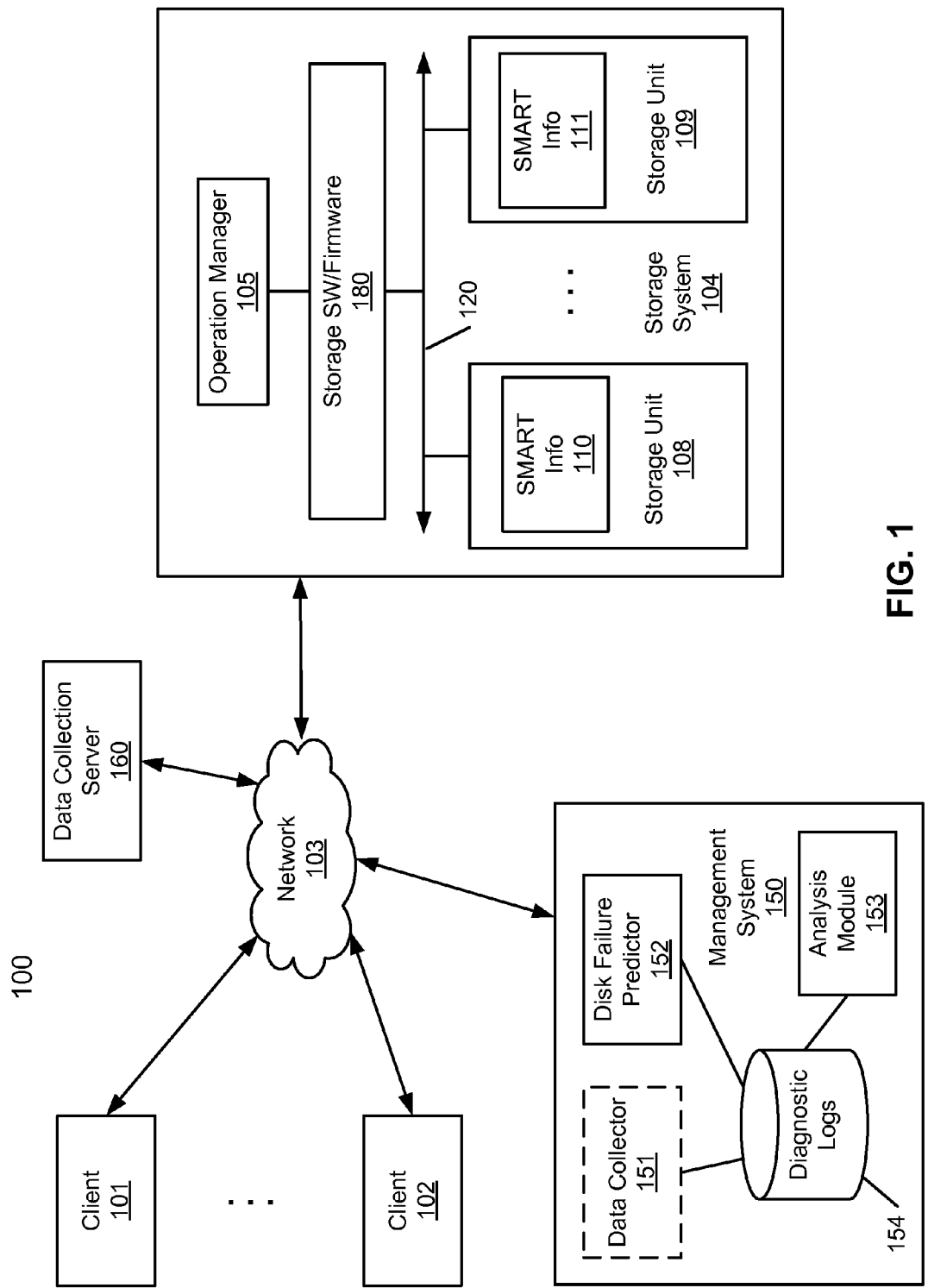
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Based on past research, the number of reallocated sectors is highly correlated with whole-disk failures as well as bursts of sector errors. Thus, the number of remapped sectors can be used to reflect or represent the health status of each disk and is a good criteria to identify unstable disks. A failure probability of a disk calculated based on the number of reallocated or remapped sectors can accurately reflect the health of the disk. Failure probabilities of individual RAID disks can be used to determine the health of the RAID.

According to some embodiments, one or more predictive models are created based on operating statistics of a large number of disks in the past. Particularly, the reallocated sector (RS) counts are collected from the disks of various storage systems to create one or more predictive models to calculate various probabilities of a target disk given certain parameters such as a reallocated sector count of the target disk. In one embodiment, the predictive models include a first model to calculate a first probability of a whole-disk failure for this specific disk model, for example, based on the past operating statistics of a large number of disks. The predictive models further include a second model to calculate a second probability that a failed disk has a reallocated sector count less than a given reallocated sector count. The predictive models further include a third model to calculate a third probability that a disk has a reallocated sector count less than a given reallocated sector count. Note that the third probability considers all disks, whether failed or functional, while the second probability considers only the failed disks. Thereafter, a probability of disk failure given the reallocated sector count of the target disk is determined based on the first, second, and third probabilities. In a RAID environment, the probabilities of individual disk failures given the respective reallocated sector counts can be determined using the above techniques. The probability of multiple ones of the RAID disks can then be determined based on the individual probabilities of disk failures.

FIG. 1 is a block diagram illustrating a storage system according to one embodiment of the invention. Referring to FIG. 1, system 100 includes, but is not limited to, one or more client systems 101-102 communicatively coupled to one or more storage systems 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, or a combination thereof, wired or wireless.

Storage system 104 may include any type of server or cluster of servers. For example, storage system 104 may be a storage server used for any of various different purposes, such as to provide multiple users with access to shared data and/or to back up mission critical data. In one embodiment, storage system 104 includes, but is not limited to, storage software or firmware 180 and one or more storage units 108-109 communicatively coupled to each other. Storage units 108-109 may be implemented locally (e.g., single node operating environment) or remotely (e.g., multi-node operating environment) via interconnect 120, which may be a bus and/or a network. Storage units 108-109 may be a part of a RAID compatible with various RAID specifications, such as, for example, the RAID-6 standard.

According to one embodiment, storage system 104 further includes an operation manager 105 to manage and monitor operations performed by storage system 104, including periodically collecting, for example, via storage software/firmware 180, and transmitting operating diagnostic data of storage units 108-109 (e.g., reallocated sector counts) to a remote device such as management system 150 over network 103. In this example as shown in FIG. 1, storage system 104 may be located at a client site and utilized by a client such as an enterprise or corporation, where the storage system 104 may be provided by a storage provider or vendor such as EMC® Corporation. In one embodiment, operation manager 105 periodically collects operating statistics concerning operations of storage units or disks 108-109 and transmits diagnostic data representing at least some of the operating statistics to management system 150, where management system 150 is associated with a storage provider or vendor that provides storage system 104 to a client.

For example, management system 150 may be operated or owned by the storage provider or alternatively, it may be operated by a third-party vendor on behalf of the storage provider. In one embodiment, the diagnostic data may include diagnostic parameters such as those defined by the Self-Monitoring, Analysis and Reporting Technology (SMART) specification and/or those defined as part of the SCSI disk return codes, which may be collected from the storage system 104, such as SMART information 110-111. SMART is a monitoring system for computer hard disk drives to detect and report on various indicators of reliability, in the hope of anticipating failures. When a failure is anticipated by SMART, the user may choose to replace the drive to avoid unexpected outage and data loss. The manufacturer may be able to use the SMART data to discover where faults lie and prevent them from recurring in future drive designs. For example, operation manager 105 may include or communicate with a SMART tool or software configured to monitor operations of storage units 108-109. Each of the storage units 108-109 may be implemented one or more individual disks or alternatively, a RAID array of disks.

Note that storage system 104 may represent a group or cluster of individual storage systems, where operation manager 105 of each storage system may be equipped with a "phone-home" functionality that may periodically transmit operating status of the respective storage system, including the diagnostic parameters (e.g., SMART attributes and SCSI return codes) of the associated storage disks, to a centralized or distributed entity, such as management server 150 or dedicated data collection entity 160 (e.g., a third-party data collection agent).

According to one embodiment, management system 150 includes a data collector 151, disk failure predictor 152, and analysis module 153. Data collector 151 is employed to communicate with operation manager 105 of storage system(s) 104 to collect diagnostic data concerning operating statuses of storage units 108-109, as well as storage system 104 in general. Note that although one storage system is shown in FIG. 1, data collector 151 may communicate with multiple operation managers of multiple storage systems to collect diagnostic data concerning the respective storage systems, which may be located at the same or different geographical locations (e.g., same or different client sites). For example, management system 150 may be a centralized management server or cluster of servers (e.g., in the cloud) for single or multiple clients or customers.

The collected diagnostic data is stored in a storage device as part of diagnostic logs 154. In one embodiment, diagnostic data 154 includes diagnostic parameters collected from various storage systems such as storage system 104. The diagnostic parameters may be those attributes (e.g., reallocated sector, pending sector, uncorrectable sector, etc.) defined by SMART. Alternatively, diagnostic parameters may be those from the SCSI return codes (e.g., medium error, timeout, connection error, data error, etc.). In one embodiment, analysis module 153 is to perform an analysis on the diagnostic data 154 such as determining which of the diagnostic parameters can be used as the best disk failure indicator(s). Disk failure predictor 152 is configured to predict, using the disk failure indicator(s), which one or more of the disks of storage units 108-109 of storage system 104 have a higher probability of disk failures.

As described in the co-pending U.S. patent application Ser. No. 14/162,409, filed Jan. 23, 2014 (which is incorporated by reference herein in its entirety), among other storage parameters, a reallocated sector count (also referred to as a remapped sector count) is a good indicator indicating whether a particular disk is a failing disk. A failing disk refers to a disk that will likely fail in the near future, completely or partially. In one embodiment, storage software/firmware 180 includes disk scrub logic that is configured to scan or scrub all sectors of each of disks associated with storage units 108-109 to detect the vulnerability of the disks. Unlike a conventional disk scrubbing process, which only scans the live sectors of the disks, the disk scrubbing logic of storage software/firmware 180 is configured to scan all sectors, including the live sectors (also referred to as in-use sectors) and non-live sectors (also referred to as non-in-use sectors).

According to one embodiment, the disk scrubbing logic scans each of the sectors of each disk by reading each sector. If an error, such as a medium error, is returned in response to the read operation indicating that the sector may be a failed sector, the disk scrubbing logic is to write data to the sector. According to the standard specification of a storage disk, when data is written to a failed sector, the write operation may trigger a sector remap process. The remap process may stores the data to be written to a new unallocated (presumably working sector) and remap the corresponding logical block address (LBA) to a physical block address (PBA) corresponding to the newly allocated sector.

In one embodiment, if the failed sector is a live sector containing live data that is accessible via the file system, the disk scrubbing logic may attempt to recover the data from other redundant data. For example, if the disk in question is one of the RAID disks, the disk scrubbing logic may recover the data from other RAID disks and write the recovered data back to the failed sector, which triggers the remap process, where the recovered data may be written to a remapped sector. If the failed sector is not a live sector, the disk scrubbing logic may generate random data and write the random data back to the failed sector to trigger the remap process.

As described above, the disk scrubbing process may cause some of the sectors to be remapped (e.g., reallocated). The remapped sector counts of the disks 108-109 may be maintained by a SMART table, such as SMART information 110-111, within the disks 108-109. Subsequently, operation manager 105 can retrieve the reallocated sector count from disks 108-109 and transmit the reallocated sector counts to management system 150 and/or data collection server 160. Based on the reallocated sector counts collected from storage system 104, analysis module 153 can perform an analysis on the collected data and generate certain predictive models. The predictive models can be used by disk failure predictor 152 to determine a failure probability, representing whether a particular disk is vulnerable based on the reallocated sector count associated with that particular disk. In a RAID environment, based on the failure probabilities of individual disks, disk failure predictor 152 can determine a failure probability of multiple RAID disks.

According to some embodiments, one or more predictive models are created based on operating statistics of a large number of disks in the past, which may be maintained as part of diagnostic logs 154. Particularly, the reallocated sector counts are collected from the disks of various storage systems to create, for example, by analysis module 153, one or more predictive models to calculate various probabilities of a target disk given certain parameters such as a reallocated sector count of the target disk. A probability of disk failure given the reallocated sector count of the target disk is determined by disk failure predictor 152 using the predictive models. In a RAID environment, the probabilities of disk failure of individual disks given the respective reallocated sector counts can be determined using the above techniques. The probability of multiple failures of the RAID disks can then be determined based on the individual probabilities of disk failures, as shown below.

Figure 2:
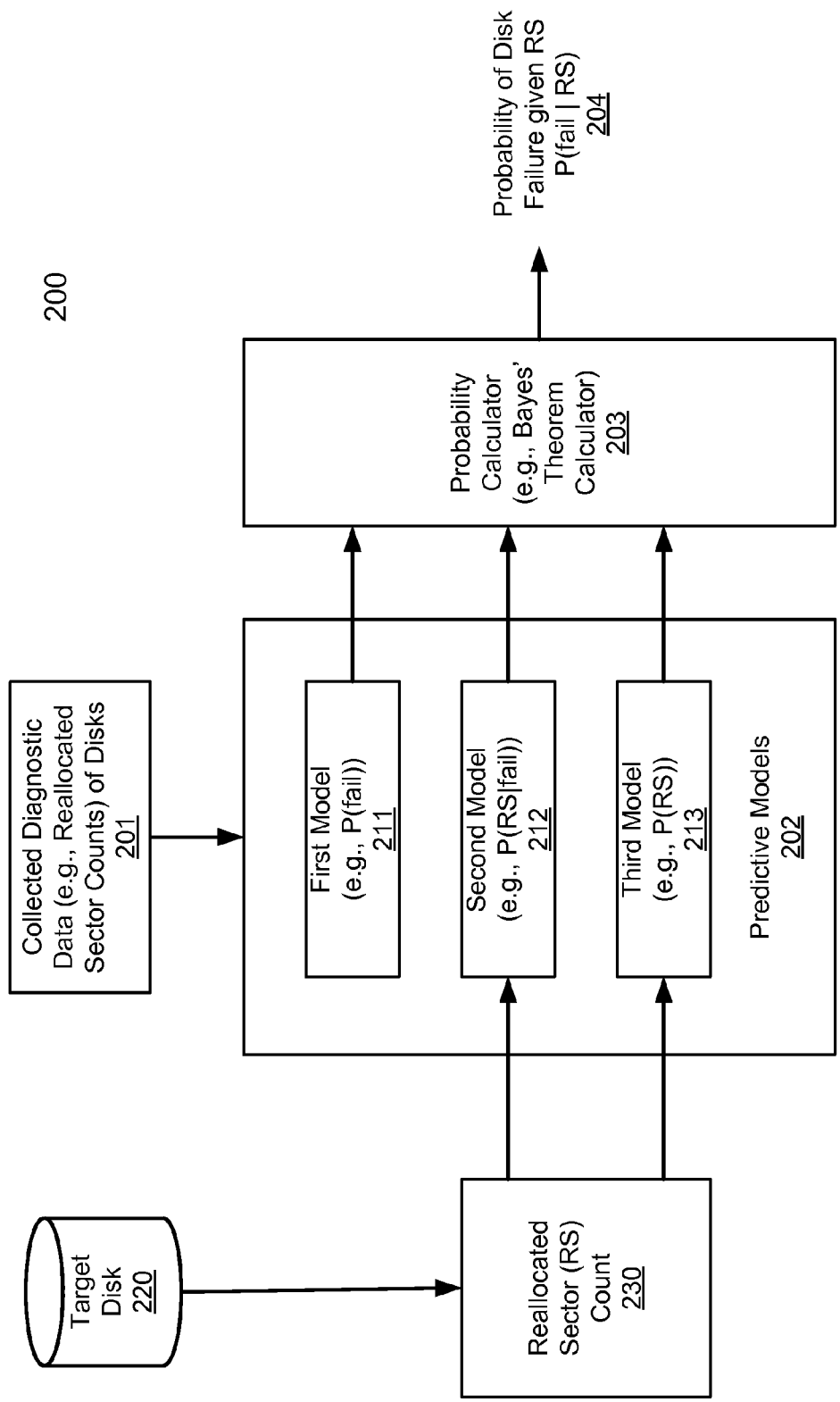
FIG. 2 is a block diagram illustrating a system for determining the vulnerability of a disk according to one embodiment of the invention.

FIG. 2 is a block diagram illustrating a system for determining the vulnerability of a disk according to one embodiment of the invention. System 200 may be implemented as part of management system 150 of FIG. 1. Referring to FIG. 2, in this example, diagnostic data of disks 201 may be collected from various disks of various storage systems over a period of time, which may be a part of diagnostic logs 154 of FIG. 1. Diagnostic data 201 may be used to create one or more predictive models 202 for determining the vulnerability of a particular disk.

In one embodiment, predictive models 202 include first model 211 to calculate a first probability of a whole disk failure, for example, based on the past operating statistics of a large number of disks. Predictive models 202 further include second model 212 to calculate a probability that a failed disk has a reallocated sector count less than a given reallocated sector count. Predictive models 202 further include third model 213 to calculate a third probability that a disk, whether it is a failed or functional disk, has a reallocated sector count less than a given reallocated sector count. Thereafter, probability 204 of disk failure given the reallocated sector count of the target disk is determined by probability calculator 203 based on the first, second, and third probabilities. In a RAID environment, the probabilities of disk failure of individual disks given the respective reallocated sector counts can be determined using the above techniques. The probability of multiple failures of the RAID disks can then be determined based on the individual probabilities of disk failures.

In one embodiment, when a reallocated sector (henceforth referred to as RS) count 230 of target disk 220 is received, the RS count 230 is fed into at least models 212-213. Based on the received RS count 230, model 212 is configured to calculate a conditional probability of a failed disk given an RS count that is less than RS count 230, referred to herein as P(RS|fail). Based on the received RS count 230, model 213 is configured to calculate a probability of a disk (e.g., regardless whether the disk is a failed or working disk) that has an RS count that is less than RS count 230, referred to herein as P(RS). Model 211 is configured to calculate a probability of a disk that is a failed disk based on the previously examined large number of disks, referred to herein as P(fail). Thereafter, a probability 204 of a disk that is a failed disk given the received RS count 230, referred to herein as P(fail|RS), is calculated by probability calculator 203 based on P(RS|fail), P(RS), and P(fail). In one embodiment, probability P(fail|RS) is calculated by multiplying P(RS|fail) with P(fail) and divided by P(RS), as shown in equation 401 of FIG. 4:

$$P(\text{fail} \mid RS) = \frac{P(RS \mid \text{fail}) \times P(\text{fail})}{P(RS)} \qquad (1)$$

The above algorithm is similar to Bayes' Theorem. In probability theory and statistics, Bayes' theorem is a result that is of importance in the mathematical manipulation of conditional probabilities. Bayes rule can be derived from more basic axioms of probability, specifically conditional probability. In particular, with the Bayesian interpretation of probability, the theorem expresses how a subjective degree of belief should rationally change to account for evidence: this is Bayesian inference, which is fundamental to Bayesian statistics. Mathematically, Bayes' theorem gives the relationship between the probabilities of A and B, P(A) and P(B), and the conditional probabilities of A given B and B given A, P(A|B) and P(B|A). In its most common form, it is:

$$P(A \mid B) = \frac{P(B \mid A)P(A)}{P(B)}.$$

In one embodiment, models 202 may be generated based on a set of known working disks and a set of known failed disks, using quantile distribution methodology. When considering disk failures, this can be interpreted as follows:

$$P(\text{fail} \mid RS) = \frac{\frac{\text{number of failed disks with } RS}{\text{number of failed disks}} \times \frac{\text{number of failed disks}}{\text{number of disks}}}{\frac{\text{number of all disks with } RS}{\text{number of disks}}}$$

Since the terms for the number of failed disks and number of disks cancel, the equation simplifies to:

$$P(\text{fail} \mid RS) = \frac{\text{number of failed disks with } RS}{\text{number of all disks with } RS}$$

This equation applies both to exact counts, such as P(fail|RS=i), and inequalities, such as P(fail|RS>=i). In the event of an inequality, the probability of failure is at least as high as the probability for an exact threshold; in other words, P(fail|RS>=i)>=P(fail|RS=i). In other words, this says that if a disk has at least i reallocated sectors, the probability it will fail is at least as high as the probability if the number of reallocated sectors is exactly i. If it has more than i reallocated sectors, its probability of failure may increase. Further details concerning such techniques can be found in the above incorporated-by-reference patent application.

For the purpose of illustration, it is assumed there are 1000 working disks and 100 failed disks. Amongst the 1000 working disks, there are 600 working disks that have an RS count of exactly 0, 250 with RS>=5, 225 with RS>=6, and 10 with RS>=250. Amongst the 100 failed disks, there is 1 failed disk with 0 RS, 85 failed disks that have an RS count>=5, 84 failed disks with RS count>=6, and 49 failed disks with RS count>=250. Thus, the following single disk conditional probabilities can be computed as follows.

The conditional probability of a failed disk given $$RS = 0, P(\text{fail} | RS = 0) = \frac{1}{1 + 600} = 0.00166,$$

which only considers the working disks and failed one with RS=0. Similarly, the conditional probability of a failed disk given RS is exactly $$5 : P(\text{fail} | RS = 5) = \frac{1}{25 + 1} = 0.03846$$

which only considers the working and failed disks with RS=5. Note that the counts of disks with RS exactly 5 come from subtracting the count with RS>=6 from the count with RS>=5. By comparison, we can also compute the probability of a failure when aggregating all disks with at least a given number of reallocated sectors. For instance, $$P(\text{fail} | RS >= 250) = \frac{49}{49 + 10} = 0.83051.$$

In a RAID configuration, P(fail|RS) represents a probability of a single RAID disk given a particular RS count. The probability of multiple disk failures can be derived from the P(fail|RS) of individual RAID disks. For example, the failure probability of at least two of the RAID disks given their respective RS counts can be calculated using equations 402-404 of FIG. 4.

From the individual failure probabilities of individual disks, their corresponding probabilities of working disks can be derived as P(work)=1-P(fail). In a RAID configuration, it is assumed there are four disks in a target RAID group. The RAID group failure can be defined as two or more disk failures in this example (assuming the disk group has 4 disks):

P(RAID group failure)=P(disk failure number>=2)=
1-P(disk_failure_num=0)-P(disk_failure_num=1).
P(disk_failure_num=0)=
P(disk1_w)*P(disk2_w)*P(disk3_w)*P(disk4_w).
P(disk_failure_num=1)=
P(disk1_failure)*P(disk2_w)*P(disk3_w)*P(disk4_w)+P(disk1_)*
P(disk2_failure)*P(disk3_w)*P(disk4_w)+P(disk1_w)*P(disk2_w)*
P(disk3_failure)*P(disk4_w)+P(disk1_w)*P(disk2_w)*P(disk3_w)*
P(disk4_failure).
P(disk failure number=0) refers to the probability of no disk failure, given the specific RS counts of the target disks in the RAID group. P(disk failure number=1) refers to the probability of one disk failure, given the specific RS counts of the target disks in the RAID group. P(disk1_w), P(disk2_w), P(disk3_w), and P(disk4_w) refer to the probabilities of working disk for disk 1 to disk 4, respectively. P(disk1_failure), P(disk2_ failure), P(disk3_ failure), and P(disk4_ failure) refer to the probabilities of disk failure for disk 1 to disk 4, given the specific RS counts of the target disks in the RAID group, respectively. Similarly, the probability of more than any number of disks can also be calculated. According to one embodiment, there are two tunable parameters: 1) the number of disk failures to be prevented, where the default number here is >=2; and 2) the number of disks in the RAID group (in this example, the number of disks is 4). Both numbers are adjustable based on different requirements and system settings.

Here are some examples of calculating the RAID vulnerable probability. Example 1: Assume a disk group has 15 disks, each of which has >=250 RS. The single disk failure probability, P(fail|RS>=250), is 0.8305. One can compute with the formula in FIG. 4 that P(vulnerable RAID|each of 15 disks has at least 250 RS)=99.99%. Example 2: Assume a disk group has 15 disks each of which has 0 RS. The single disk failure probability, P(fail|RS=0) is 0.166%. Then P(vulnerable RAID|each of 15 disks has 0 RS)=0.0287%. Example 3: Assume a disk group has 2 disks with >=250 RS, while the remaining 13 have 0 RS. Then P(vulnerable RAID|2 disks have at least 250 RS; 13 disks have 0 RS)=69.58%.

According to one embodiment, the RS counts of the RAID disks can be obtained by performing a disk scrubbing process on all sectors of each of the RAID disks, including the live or in-used sectors and non-live or not-in-used sectors, which will accurately represent the vulnerability of the disk. In response to an error, such as a medium error, occurred during the disk scrubbing process, a remap process is triggered and the reallocated sector count of the disk is updated.

Figure 3:
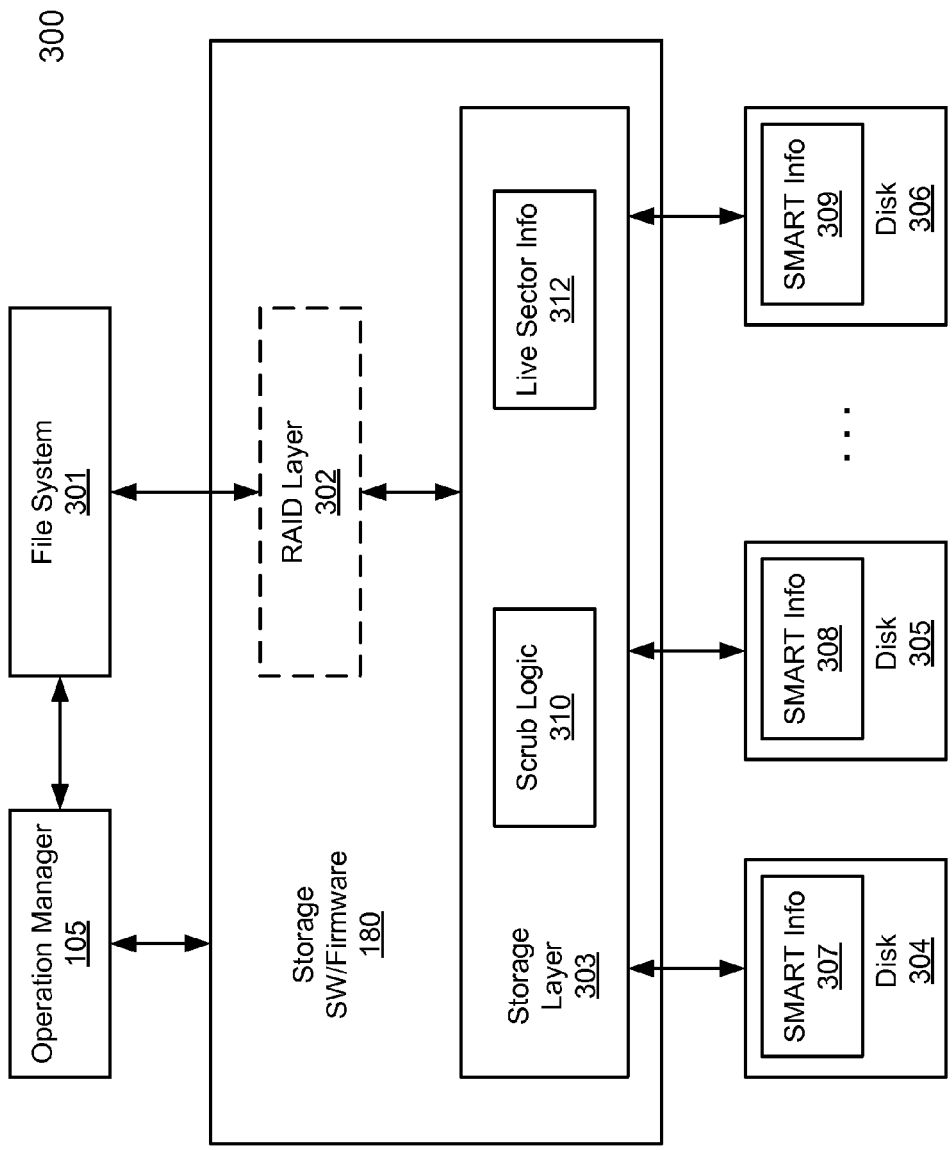
FIG. 3 is a block diagram illustrating a storage system according to one embodiment of the invention.

FIG. 3 is a block diagram illustrating a storage system according to one embodiment of the invention. System 300 may be implemented as part of system 100 of FIG. 1. Referring to FIG. 3, system 300 includes, but is not limited to, operation manager 105 communicatively coupled to file system 301, which communicates with storage software/firmware 180 via optional deduplication engine 107. Operation manager 105 may also communicate with storage software/firmware 180. File system 301 provides a file system interface to a variety of clients, such as backup software 106 and operation manager 105. File system 301 processes client requests by sending read and write operations to storage software/firmware 180, which in turn communicates with disks 304-306. Disks 304-306 may represent storage units 108-109 of FIG. 1.

In a RAID environment, disks 304-306 may represent RAID disks providing redundant protection with each other. Storage software/firmware 180 may further include RAID layer 302 and storage layer 303. Each of disks 304-306 maintains SMART information 307-309, respectively. The SMART information may be queried and retrieved via a SMART interface (not shown). For example, operation manager 105 can retrieve a reallocated sector count from each of disks 304-306. In this example, RAID layer 302 transforms the requests received from file system 301 into disk logical block requests and passes the disk logical block requests to storage layer 303 to access the corresponding physical blocks in any of disks 304-306. RAID layer 302 may include functionalities that are compatible with RAID-6 specification, which provide redundant protection for up to two simultaneous disk failures.

In one embodiment, storage layer 303 includes disk scrubbing logic 310 and live sector information 312. Disk scrubbing logic 310 is to perform a disk scrubbing process on disks 304-306. Live sector information 312 stores information indicating which of the sectors are alive and accessible via file system 301, which may be implemented using a variety of data structures (e.g., bitmaps). In one embodiment, disk scrubbing logic 310 is configured to scan all sectors of each of disks 304-306 by reading from each sector. If there is an error returned in response to the read operation, disk scrubbing logic 310 writes certain data back to the failed sector to trigger a sector remap or reallocation process. The SMART information (e.g., SMART information 307-309) of the corresponding disk may be updated to reflect the reallocated sector count.

In a RAID environment, if an error is detected in response to a read operation, according to one embodiment, RAID layer 302 may be invoked to recover the data originally stored in the failed sector from other RAID disks and write the recovered data back to the failed sector to trigger the remap process. Subsequently, operation manager 105 can retrieve the reallocated sector counts from disks 304-306 and transmit the reallocated sector counts to management server 150 to determine the vulnerability of disks 304-306.

Figure 5:
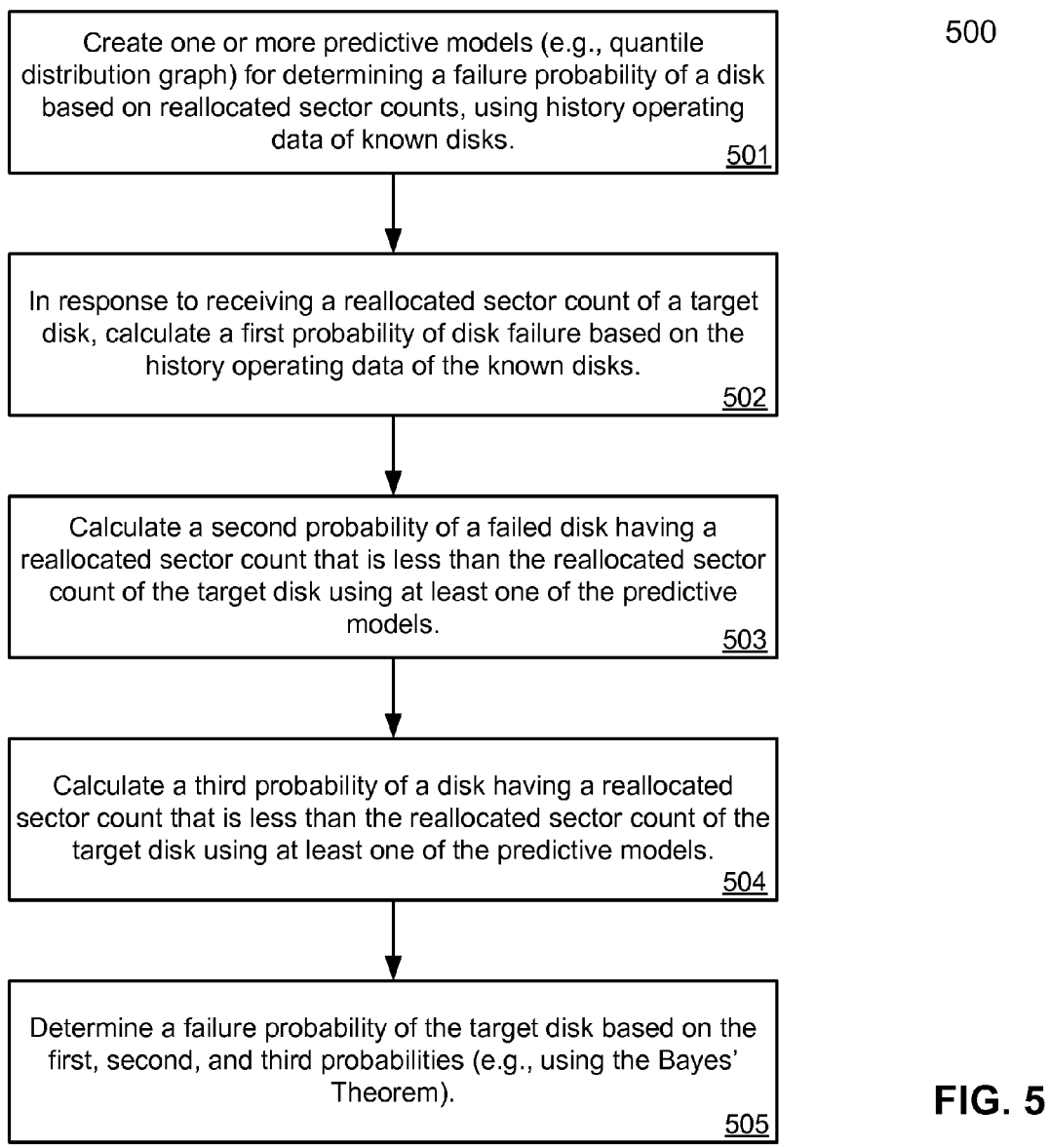
FIG. 5 is a flow diagram illustrating a process for determining vulnerability of disks according to one embodiment of the invention.

FIG. 5 is a flow diagram illustrating a process for determining vulnerability of disks according to one embodiment of the invention. Process 500 may be performed by processing logic which may include software, hardware, or a combination thereof. For example, process 500 may be performed by management server 150 of FIG. 1. Referring to FIG. 5, at block 501, one or more predictive models, such as quantile distribution graphs, are created for determining a failure probability of a disk based on reallocated sector counts using history operating data of known disks. The predictive models may those described above with respect to FIG. 2. In response to receiving a reallocated sector count of a target disk, at block 502, processing logic calculates a first probability of disk failures using history operating data of the known disks. At block 503, processing logic calculates a second probability of a failed disk having a reallocated sector count that is less than the reallocated sector count of the target disk using at least one of the predictive models. At block 504, processing logic calculates a third probability of a disk having a reallocated sector count that is less than the reallocated sector count of the target disk using at least one of the predictive models. At block 505, a failure probability of the target disk given its reallocated sector count is determined based on the first, second, and third probabilities. In one embodiment, the failure probability of the target disk is calculated using the Bayes' Theorem formula based on the first, second, and third probabilities.

Figure 6:
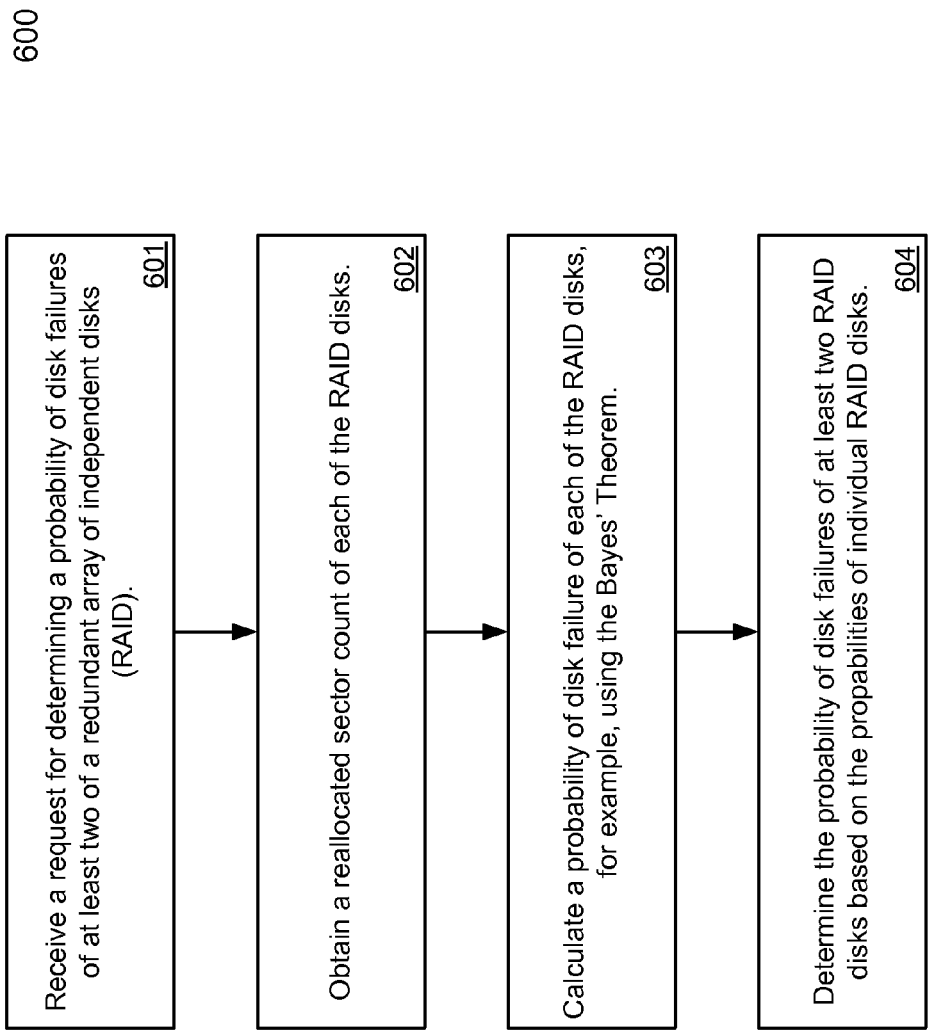
FIG. 6 is a flow diagram illustrating a process for determining vulnerability of multiple disk failures in a RAID environment according to one embodiment of the invention.

FIG. 6 is a flow diagram illustrating a process for determining vulnerability of multiple disk failures in a RAID environment according to one embodiment of the invention. Process 600 may be performed by processing logic which may include software, hardware, or a combination thereof. For example, process 600 may be performed by management server 150 of FIG. 1. Referring to FIG. 6, at block 601, a request for determining a probability of multiple disk failures of a RAID is received. In response to the request, at block 602, processing logic obtains a reallocated sector count for each of the disks in the RAID. At block 603, processing logic calculates a failure probability of each of the disks in the RAID, for example, using the Bayes' Theorem as described above (e.g., as part of process 500 of FIG. 5). At block 604, a failure probability of at least two of the disks in the RAID is determined based on the failure probabilities of the individual disks in the RAID.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for determining vulnerability of disks, comprising:
  for each of a plurality of disks representing a redundant array of independent disks (RAID), obtaining a reallocated sector count associated with the disk, the reallocated sector count representing a number of sectors that have been reallocated due to an error of a storage transaction to the disk, and determining a failure probability of the disk given the obtained reallocated sector count using a predictive model, including calculating a second probability of a failed disk that has a reallocated sector count greater than the obtained reallocated sector count, wherein the predictive model was generated based on history operating data of a set of known disks; and determining a failure probability of at least two of the disks in the RAID based on the failure probability of each of the disks to determine vulnerability of the RAID.

2. The method of claim 1, wherein determining a failure probability of the disk given the reallocated sector count comprises calculating a first probability of a disk that is a failed disk based on the history operating data of the known disks.

3. The method of claim 2, further comprising calculating a third probability of a disk that has a reallocated sector count greater than the obtained reallocated sector count.

4. The method of claim 3, wherein the failure probability of the disk given the reallocated sector count is determined based on the first probability, the second probability, and the third probability.

5. The method of claim 4, wherein the failure probability of the disk given the reallocated sector count is determined based on the first probability multiplied by the second probability and divided by the third probability.

6. The method of claim 1, wherein the failure probability of at least two of the disks in the RAID is determined at a management server coupled to the disks over a network, and wherein the reallocated sector count of each of the disks in the RAID is periodically collected by the management server from each disk.

7. A non-transitory machine-readable medium having instructions stored therein, which when executed by a processor, cause the processor to perform operations for determining vulnerability of disks, the operations comprising:

for each of a plurality of disks representing a redundant array of independent disks (RAID), obtaining a reallocated sector count associated with the disk, the reallocated sector count representing a number of sectors that have been reallocated due to an error of a storage transaction to the disk, and determining a failure probability of the disk given the obtained reallocated sector count using a predictive model, including calculating a second probability of a failed disk that has a reallocated sector count greater than the obtained reallocated sector count, wherein the predictive model was generated based on history operating data of a set of known disks; and determining a failure probability of at least two of the disks in the RAID based on the failure probability of each of the disks to determine vulnerability of the RAID.

8. The non-transitory machine-readable medium of claim 7, wherein determining a failure probability of the disk given the reallocated sector count comprises calculating a first probability of a disk that is a failed disk based on the history operating data of the known disks.

9. The non-transitory machine-readable medium of claim 8, wherein the operations further comprise calculating a third probability of a disk that has a reallocated sector count greater than the obtained reallocated sector count.

10. The non-transitory machine-readable medium of claim 9, wherein the failure probability of the disk given the reallocated sector count is determined based on the first probability, the second probability, and the third probability.

11. The non-transitory machine-readable medium of claim 10, wherein the failure probability of the disk given the reallocated sector count is determined based on the first probability multiplied by the second probability and divided by the third probability.

12. The non-transitory machine-readable medium of claim 7, wherein the failure probability of at least two of the disks in the RAID is determined at a management server coupled to the disks over a network, and wherein the reallocated sector count of each of the disks in the RAID is periodically collected by the management server from each disk.

13. A system for determining vulnerability of disks, comprising:

a processor;

a data collector executed by the processor to for each of a plurality of disks representing a redundant array of independent disks (RAID), obtain a reallocated sector count associated with the disk, the reallocated sector count representing a number of sectors that have been reallocated due to an error of a storage transaction to the disk;

an analysis module executed by the processor to determine a failure probability of the disk given the obtained reallocated sector count using a predictive model, including calculating a second probability of a failed disk that has a reallocated sector count greater than the obtained reallocated sector count, wherein the predictive model was generated based on history operating data of a set of known disks; and a disk failure predictor executed by the processor to determine a failure probability of at least two of the disks in the RAID based on the failure probability of each of the disks to determine vulnerability of the RAID.

14. The system of claim 13, wherein determining a failure probability of the disk given the reallocated sector count comprises calculating a first probability of a disk that is a failed disk based on the history operating data of the known disks.

15. The system of claim 14, wherein the analysis module is to calculate a third probability of a disk that has a reallocated sector count greater than the obtained reallocated sector count.

16. The system of claim 15, wherein the failure probability of the disk given the reallocated sector count is determined based on the first probability, the second probability, and the third probability.

17. The system of claim 16, wherein the failure probability of the disk given the reallocated sector count is determined based on the first probability multiplied by the second probability and divided by the third probability.

18. The system of claim 13, wherein the failure probability of at least two of the disks in the RAID is determined at a management server coupled to the disks over a network, and wherein the reallocated sector count of each of the disks in the RAID is periodically collected by the management server from each disk.

* * * * *